H. S. HOYMAN
Cultivator.
No. 196,903.  Patented Nov 6, 1877.
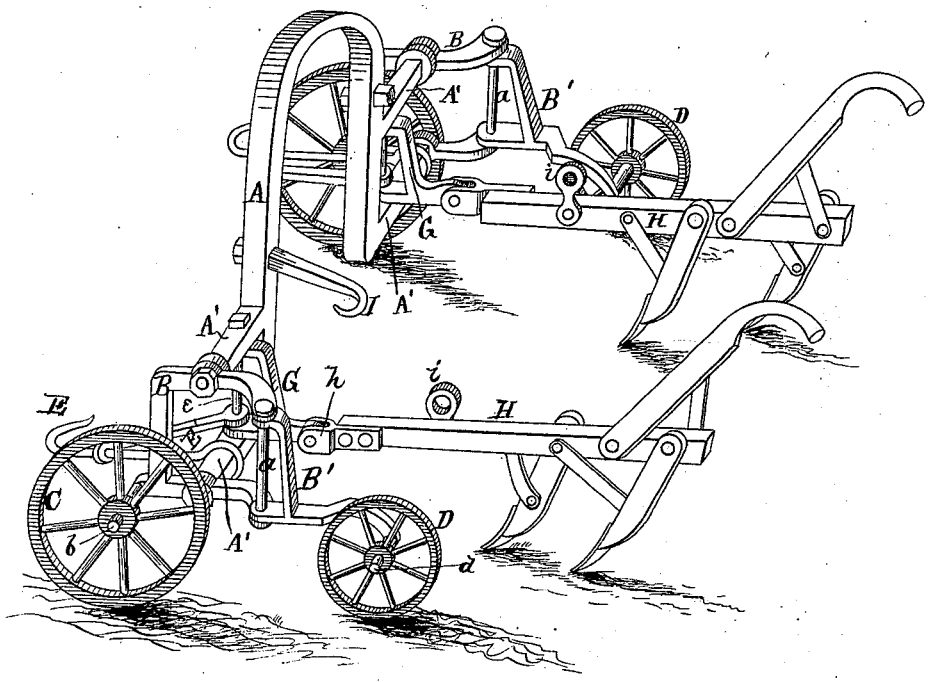
WITNESSES
Henry N. Miller
Frank Galt
INVENTOR
H. S. Hoyman,
Alexander Mason
ATTORNEYS

UNITED STATES PATENT OFFICE.

HENRY S. HOYMAN, OF STANWOOD, IOWA.

IMPROVEMENT IN CULTIVATORS.

Specification forming part of Letters Patent No. 196,903, dated November 6, 1877; application filed September 27, 1877.

*To all whom it may concern:*

Be it known that I, HENRY S. HOYMAN, of Stanwood, in the county of Cedar, and in the State of Iowa, have invented certain new and useful Improvements in Cultivators; and do hereby declare that the following is a full, clear, and exact description thereof, reference being had to the accompanying drawings, and to the letters of reference marked thereon, making a part of this specification.

The nature of my invention consists in the construction and arrangement of a cultivator, as will be hereinafter more fully set forth.

In order to enable others skilled in the art to which my invention appertains to make and use the same, I will now proceed to describe its construction and operation, referring to the annexed drawing, which represents a perspective view of my improved cultivator.

A represents an arched axle, each arm of which is provided with two parallel arms, A' A', one above the other. On the ends of each set of these arms is fastened a frame, B, by means of nuts, substantially as shown. From the lower front corner of each frame B projects outward a spindle, $b$, upon which a driving-wheel, C, is placed. In the rear end of each frame B is, by means of a vertical pin or bolt, $a$, swiveled an auxiliary frame, B', provided at its rear end with an outwardly-projecting spindle, $d$, on which a wheel, D, is placed.

The frame B', with the wheel D, forms a caster for the cultivator; and said frame B' consists simply of a bottom bar with an upwardly-projecting arm, the upper end of said arm being bent forward parallel to the bottom bar, and the pin or bolt $a$ passing through the ends of the arm and bar, as shown.

E is the draft-hook, fastened around the lower arm A', and provided with a brace, E', the rear end of which is formed with an eye. A pin or bolt, $e$, is passed through the inner ends of the two arms A' A', and passes also through the eye in the rear end of the brace E'. This pin or bolt $e$ also passes through and swivels a frame, G, exactly similar in construction to the auxiliary frame B', above described.

To the rear end of the bottom bar of the frame G is pivoted a clevis, $h$, attached to the front end of the cultivator-beam H, said beam being provided with an ordinary handle, plow-standards, and plows.

The beam H is also provided with an eye, $i$, so that the beam can be elevated and suspended from a hook, I, fastened in and projecting rearward from the side of the arched axle A.

It is, of course, understood that both sides of the cultivator are constructed exactly alike.

The two front wheels C C, arranged as shown, keep the arch and plow from falling on the horse's heels.

The caster-wheels D D enable the driver to turn around in the next row, and also set the plow so that the gangs can be put up at the end of each row in turning; and with the four wheels as arranged, the cultivator can be handled easy and moved from place to place.

Through the hubs and spindles of the casters or hind wheels holes are intended to be made, so that a nail or pin can be dropped in for a lock, in case of hilly or rolling ground, where men will have to move the plow on the road.

Having thus fully described my invention, what I claim as new, and desire to secure by Letters Patent, is—

1. In a cultivator, the combination of the arched axle A, with parallel arms A' A' at each end, the frames B B, attached to said arms and projecting forward thereof, the spindles $b\ b$, projecting from said frames in front of the axle, and the wheels C C, placed on said spindles, substantially as and for the purposes herein set forth.

2. In a cultivator, the combination, with the arched axle A, having arms A' A', the frames B B, and the wheels C C, of the hinged or swiveled frames B' B', having spindles $d\ d$ and the wheels D D, substantially as and for the purposes herein set forth.

In testimony that I claim the foregoing I have hereunto set my hand this 27th day of August, 1877.

H. S. HOYMAN.

Witnesses:
S. H. MALEY,
W. A. RIGBY.